3,684,443
Patented Aug. 15, 1972

3,684,443
PROCESS FOR THE PRODUCTION OF FIBROUS REFRACTORY OXIDES OF POLYVALENT ELEMENTS
Hans Zirngibl, Duisburg, and Gerhard Winter, Henning Erfurth, and Manfred Mansmann, Krefeld, Germany, assignors to Farbenfabriken Bayer Aktiengesellschaft, Leverkusen, Germany
No Drawing. Continuation-in-part of application Ser. No. 888,963, Dec. 29, 1969. This application May 8, 1970, Ser. No. 35,924
Claims priority, application Germany, Jan. 2, 1969, P 19 00 064.7; Aug. 28, 1969, P 19 43 636.3
Int. Cl. C01g 23/04, 1/02, 25/02
U.S. Cl. 423—612                         12 Claims

ABSTRACT OF THE DISCLOSURE

A method for the production of oxide whiskers of the elements Ti, Be, Mg, Ca, Zn, B, Al, rare earth metals, Si, Sn, V, Zr, Sb, Cr, Mn and Fe or mixtures thereof by contacting a compound of the aforementioned elements with a melt of at least one salt of a sulfur-containing oxyacid capable of forming a volatile anhydride under the reaction conditions. Optionally the melt contains additionally at least one metal halide preferably an alkali metal or alkaline earth metal halide. Normally the reaction is carried out at a temperature of between about 600 and 1200° C. The oxide whiskers which form in the melt are easily separated from the reaction mixture either by centrifuging or filtering the hot melt or by removing the whiskers from the reaction byproducts still in the melt by dissolving said byproducts in water.

The present application is a continuation-in-part of our prior and copending application Ser. No. 888,963, filed Dec. 29, 1969 now abandoned.

This invention relates to a process for the production of fibrous refractory oxides of polyvalent elements in the so-called whisker form, with an aspect ratio of at least 10:1, and preferably from 100:1 to 2000:1, or more. In the present context, the aspect ratio is defined as the ratio of length to diameter of a crystal. The whiskers are filament-like monocrystals. The whiskers produced in accordance with the invention have a length of at least about $2000/\mu$ and diameters of from about less than $1\mu$ to around $5\mu$, and preferably from $1\mu$ to $3\mu$.

By virtue both of their resistance to high temperatures and their outstanding ability to reflect infra-red rays, the oxide whiskers that can be produced in accordance with the invention can be used as insulating materials at high temperatures. In addition, they are eminently suitable for use as reinforcing components in composite materials by virtue of their extreme aspect ratio, their outstanding strength and their high Young's modulus of elasticity. The oxide fibres can readily be converted into felt-like mats and by virtue of their outstanding chemical resistance may be used, for example, as a filter material for hot and corrosive liquids and gases.

A process for the production of fibrous oxides of the elements titanium, beryllium, magnesium, calcium, zinc, boron, aluminum rare earth metals such as those with atomic numbers of 58 through 72, silicon, tin, vanadium, zirconium, antimony, chromium, manganese, iron and mixtures thereof by reacting a compound of the aforementioned elements which is convertible under the reaction conditions to the corresponding oxide, preferably a volatile compound, with a salt of an oxyacid in the melt has now been found in which a metal compound or a mixture of metal compounds, possibly in admixture with one or more carrier gases, is contacted at a temperature above 600° C. with a melt of one or more salts of a sulfur-containing oxyacid which is able to form a volatile anhydride under the reaction conditions, and the fibrous oxide obtained is subsequently separated from the reaction medium.

It is of advantage to add metal halides, preferably metal chlorides, to the melt of one or more salts of said oxyacid salts are able to form volatile anhydrides under the reaction conditions.

Surprisingly, it is readily possible under the conditions according to the invention to obtain fibrous oxides with an aspect ratio of at least 10:1, generally from 100:1 to 2000:1, without any of the disadvantages of conventional processes. Oxide needles are obtained which are shown to be monocrystals (whiskers) by X-ray diffractions and investigations under a polarisation microscope.

The following table shows the results of two tests, one of which was carried out with chlorides and the other in the absence of chlorides under otherwise the same conditions. Tests show that the addition of chlorides considerably increases the number of needles with a relatively high degree of fineness.

Composition of the melt:

(A)

| | G. |
|---|---|
| $Na_2SO_4$ | 4.8 |
| $MgSO_4$ | 3.2 |

(B)

| | |
|---|---|
| $Na_2SO_4$ | 4.8 |
| $MgSO_4$ | 3.2 |
| LiCl | 15.3 |
| NaCl | 4.7 |

| Needle length, $\mu$ | Number of needles | Number of needles |
|---|---|---|
| 50–200 | 673 | 180 |
| 201–300 | 164 | 124 |
| 301–400 | 107 | 133 |
| 401–500 | 34 | 123 |
| 501–600 | 10 | 78 |
| 601–700 | 6 | 87 |
| 701–1,500 | 6 | 252 |
| 1,501–2,000 | | 20 |
| >2,000 | | 3 |
| Total | 1,000 | 1,000 |
| Average needle width ($\mu$) | 2 | 2 |

The temperature during the process depends on the composition of the salt melt and on the chemical reaction which occurs during the conversion of the metal compound to the oxide.

The process is carried out at a temperature of from 600 to 1200° C., preferably from 750 to 950° C. At these temperatures, the melts do not have a corroding effect upon the container material used, quite unlike melts based on boron oxide, borates, fluorides and complex fluorides. Accordingly, in most cases the process may also be carried out in an apparatus made of ceramic materials.

Another advantage is that, on completion of the reaction, the residual melt can readily be separated from the fibrous oxide formed. For example, the melt can readily be dissolved in cold water. It is also possible, however, to separate the oxide fibres formed from the low-viscosity melt at elevated temperatures.

The oxide whiskers are easy to work up. The residual melt is dissolved with cold water or warm water and the whiskers obtained may then be readily separated from the aqueous phase by filtration or decantation. If desired, the whiskers may then be divided up into the required fractions either by elution or by screening.

The metal compounds which are to be converted to the oxide may be contacted with the salt melt in solid, liquid or gaseous state, or in a combination of these physical states. The starting materials are not limited to a certain type of compounds. For the production of fibrous $TiO_2$, $SnO_2$, $SiO_2$ or $Al_2O_3$ the corresponding chlorides, fluorides or sulfates are the most suitable. But also other compounds such as sulfides, hydroxides, double sulfates, nitrides, nitrites, nitrates, carbonates, carboxylates, alkoxides, thiosulfates, borates or mixtures thereof may be used.

The salt melt has to supply the oxygen needed for the conversion of the metal compound to the oxide.

Salts such as sulfates, hydrogen sulfates, polysulfates, thiosulfates, sulfites, disulfites, or mixtures thereof, may be used as the oxygen-yielding components of the melt in the practical application of the process. Such salt melt components (as, for example, sulfates) are normally able to exist—under normal pressure—over a broad temperature range without decomposition. If a metal sulfate is used as starting compound for the production of fibrous oxides it must be decomposable to the oxide under the reaction conditions.

The following sulfates or combinations thereof have proven to be particularly effective: $Li_2SO_4$, $Na_2SO_4$, $K_2SO_4$, $CuSO_4$, $MgSO_4$, $ZnSO_4$, $CdSO_4$, $KAl(SO_4)_2$, $MnSO_4$ and $NiSO_4$.

The halides of monovalent, divalent and polyvalent metals may be used as metal halide components of the melt, provided they do not have an excessive vapour pressure at the reaction temperature. It has been found that, of the halides, the chlorides are the most suitable. The longest and finest oxide needles grow in melts containing at least one chloride selected from the group: $LiCl$, $NaCl$, $KCl$, $MgCl_2$ and $CaCl_2$.

Optimum melts for the production of oxide fibres are obtained under the reaction conditions from the combination of the aforementioned preferred sulfates and chlorides. The ratio by weight of the metal sulfate to metal halide may be varied within wide limits. However, a content of from 65% to 90% by weight of metal halide has proven to be of particular advantage.

If the starting components are used in gaseous state, e.g. as $SnCl_4$, $SiCl_4$, $TiCl_4$ or $AlCl_3$-gas, it was noticed that the crystallisation process takes place primarily on the surface of the melt. In order to ensure that the reaction is as complete as possible, therefore, a large melt surface is offered to the gas to be reacted. The oxide whiskers are readily formed at a constant melt temperature. Accordingly, there is no need for a special temperature program for nucleus and needle growth. The high rate of formation of the oxide whiskers in the melts used in accordance with the invention is extremely favourable. Experience has shown that a reaction time of 1 hour is sufficient to grow long whiskers in high yields. The yield per unit time is considerably higher than in the processes mentioned in the literature.

The process is best carried out at normal pressure, although it may also be carried out at elevated pressure or reduced pressure. The quantity of the starting materials used can be varied within wide limits. Excess gaseous starting materials can be recovered by condensation of gaseous effluent and recycled to the process.

The gaseous starting materials, e.g. $TiCl_4$, $SnCl_4$, $SiCl_4$ or $AlCl_3$ may advantageously be used in admixture with a carrier gas. Nitrogen or air, for example, may be used as the carrier gas, although it is also possible to use undiluted gaseous reactants.

The technical terms as used herein are defined by H. W. Rauch et al. in "Ceramic Fibers and Fibrous Composite Materials," 1968, Ac. Press, New York, London.

The process according to the invention is illustrated by the following examples:

EXAMPLE 1

5.0 g. of a mixture of 60% by weight of $Na_2SO_4$ and 40% by weight of $MgSO_4$ were fused in a stream of pure dry nitrogen in an electrically heated tubular furnace at a temperature of 900° C. After this temperature had been reached and before entering the reaction tube, the stream of nitrogen (40 litres per hour) was passed through a supply vessel containing $TiCl_4$ at room temperature. The $TiCl_4$-loaded stream of nitrogen was allowed to flow over the melt for period of 60 minutes, and the melt was then cooled in a nitrogen atmosphere. During the reaction time of 1 hour, the weight of the titanium tetrachloride in the supply vessel underwent a reduction of 5.2 g. Numerous beard-like, crystalline efflorescences had formed. The cooled reaction product was freed with water from any melt still adhering to it. Washing with distilled water and drying at 120° C. left 1.2 g. of $TiO_2$ whisker in the form of a loose asbestos-like felt which was examined under a microscope and measured. The yield of fibrous titanium dioxide came to around 95% by weight. The rest consisted of isometric particles. The $TiO_2$ needles had lengths of up to $430\mu$ and an average thickness of less than $1\mu$.

EXAMPLE 2

20 g. of a mixture of 60% by weight of $Na_2SO_4$ and 40% by weight of $MgSO_4$ were fused and heated to a temperature of 810° C. in a dry nitrogen atmosphere (28 litres per hour) by means of an electric crucible furnace. The crucible sealed with a close-fitting ceramic plate was provided with a thermocouple, an inlet pipe for nitrogen and for a mixture of $TiCl_4$ and nitrogen and an exhaust pipe. When the melt had reached a temperature of 810° C., the nitrogen was passed through liquid $TiCl_4$ at 90° C. before entering the reaction vessel. After 2 hours, the supply of $TiCl_4$ was shut off and the vessel was flushed with nitrogen. During this period, the weight of the titanium tetrachloride in the supply vessel underwent a reduction of 46 g.

Working up in the usual way with distilled water left 9.6 g. of $TiO_2$ in the form of a fairly loose, woolly white product from which the following needle fractions were isolated by elution in water followed by screening (mesh width 150 and $40\mu$):

Fraction 1:
   Needle length up to $1000\mu$
   Needle diameter 1 to $2\mu$
Fraction 2:
   Needle length up to $800\mu$
   Needle diameter $1\mu$
Fraction 3:
   Needle length up to $800\mu$
   Needle diameter $<1$ to $1\mu$

EXAMPLE 3

6.7 g. of $TiCl_4$ vapour were passed for 4 hours at 900° C. over 13.0 g. of a mixture of 30% by weight of $Na_2SO_4$ and 70% by weight of $MgSO_4$. The carrier gas was nitrogen (14 litres per hour). Working up leaves 1.4 g. of $TiO_2$ whiskers which contain hardly any isometric components. The needles have a length of up to $640\mu$ and diameters of from 1 to $2\mu$.

EXAMPLE 4

A mixture of 4.8 g. of $Na_2SO_4$, 3.2 g. of $MgSO_4$ and 20 g. of $NaCl$ accommodated in an $Al_2O_3$ crucible was fused and heated to a temperature of 950° C. in a dry nitrogen atmosphere (40 litres per hour) by means of an electric crucible furnace. The crucible sealed with a tight-fitting ceramic plate was provided with an inlet pipe for nitrogen and for a mixture of $TiCl_4$ and nitrogen and also with an exhaust pipe. The temperature was measured with a thermocouple in the outer wall of the crucible. When the melt had reached a temperature of 950° C., the nitrogen was passed through liquid $TiCl_4$ at room temperature before entering the reaction vessel. After 1 hour, the supply of TiCl₄ was shut off followed by flushing with nitrogen. During this period, the weight of the titanium tetrachloride in the supply vessel was reduced by 5.2 g.

Numerous crystalline efflorescenes had formed on the base and primarily on the inner wall of the crucible. The cooled reaction product was freed with water from any melt adhering to it. Washing with distilled water and drying at 120° C. left 1.21 g. of $TiO_2$ whisker in the form of a loose asbestos-like felt which was examined under a microscope and measured. The $TiO_2$ needles had lengths of up to 2410μ and an average thickness of 2μ.

EXAMPLE 5

5.9 g. of $TiCl_4$ vapour were allowed to flow for 1 hour at 900° C. over a salt mixture of 4.8 g. of $Na_2SO_4$, 3.2 g. of $MgSO_4$, 15.3 g. of LiCl and 4.7 g. of NaCl. The carrier gas was nitrogen (40 litres per hour). Working up left 1.5 g. of $TiO_2$ whiskers which contained hardly any isometric components. The needles had lengths of up to 2310μ and an average diameter of 2μ.

EXAMPLE 6

A mixture of 10 g. of $K_2SO_4$, 10 g. of $CaCl_2$ and 10 g. of LiCl was treated with $TiCl_4$ vapour under the same conditions as in Example 5. 4.3 g. of $TiCl_4$ vapour were passed over the melt. 0.94 g. of fibrous titanium dioxide with needle lengths of up to 1590μ and an average needle width of 2μ were obtained from the reaction product.

| Composition of the melt (g.) | Temperature (° C.) | Duration of test (hours) | Stream of nitrogen¹ 1/h | Needle length (μ) | Needle width (μ) |
|---|---|---|---|---|---|
| Example: | | | | | |
| 7 ........ 4 $ZnSO_4$, 10 $CaCl_2$, 10 KCl ................ | 900 | 1 | 40 | ca. 1,375 | 2-3 |
| 8 ........ 8.57 $ZnSO_4$, 7.93 KCl ................... | 900 | 1 | 40 | ca. 2,100 | 2-3 |
| 9 ........ 10 $NiSO_4$, 20 NaCl ...................... | 900 | 1 | 40 | ca. 1,635 | 2-3 |
| 10 ....... 4 $CuSO_4$, 20 NaCl ....................... | 900 | 1 | 40 | ca. 1,687 | 2-3 |
| 11 ....... 4 $CdSO_4$, 10 $CaCl_2$, 10 NaCl ........... | 900 | 1 | 40 | ca. 1,956 | 1 |
| 12 ....... 5.45 $KAl(SO_4)_2$, 6.6 $CaCl_2$, 13.4 NaCl | 1,000 | 1 | 40 | ca. 1,515 | 1-2 |

¹ Through $TiCl_4$ at room temperature.

EXAMPLE 13

16.3 g. of $SnCl_4$ vapour were passed for one hour at 950° C. over a fused mixture of 4.8 g. of $Na_2SO_4$, 3.2 g. of $MgSO_4$ and 20 g. of NaCl. The carrier gas was nitrogen (40 litres per hour). Working up leaves 0.25 g. of fine $SnO_2$-needles which contain hardly any isometric components. The needles had lengths of up to 700μ and an average thickness of about 2μ.

In the same manner $ZrCl_4$ vapour was passed at 950° C. over a fused eutectic mixture of $Na_2SO_4$ and $MgSO_4$. The carrier gas was nitrogen. Working up leaves colourless $ZrO_4$-needles which had lengths of up to 700μ and a thickness of 20 to 80μ.

If $ZrCl_4$ was replaced by a vaporous mixture of $FeCl_3$ and $SbCl_5$ red-brown, transparency needles were obtained at 900° C. These needles consisting of $Fe_2O_3$ and $Sb_2O_5$ had lengths of up to 520μ and an average thickness of about 2μ.

EXAMPLE 14

7.3 g. of $AlCl_3$ vapour were passed for two hours at 1000° C. in a tube furnace over a melt of 10 g. of $Na_2SO_4$. The carrier gas was nitrogen (20 litres per hour). $Al_2O_3$ needles with needle lengths of from 20 to 50μ and an average thickness of 2μ were obtained.

EXAMPLE 15

35 g. of $SiCl_4$ vapour were passed for one hour at 900° C. over a fused mixture of 6 g. of $Na_2SO_4$ and 4 g. of $MgSO_4$. The carrier gas was nitrogen (10 litres per hour). Working up in the above described way with water and diluted HCl leaves woolly $SiO_2$-fibres.

EXAMPLE 16

A mixture of 1.1 g. of $TiOSO_4$, 1.5 g. of $NaHSO_4$ and 28 g. of $Na_2SO_4$, accommodated in a platinum crucible, was fused and heated to a temperature of 1200° C. for three hours. The mixture was allowed to cool in the furnace. The cooled reaction product was freed with water from any melt adhering to it. The residue consisted of $TiO_2$-needles with rutile structure. The needles had lengths of up to 700μ and an average thickness of between 2 and 5μ. The yield of fibrous $TiO_2$ came to around 97% by weight; the rest consisted of isometric particles.

EXAMPLE 17

A mixture of 1.35 g. of $K_2TiF_6$ and 29.5 g. of $Na_2SO_4$ accommodated in a platinum crucible, was heated to a temperature of 1050° C. during two hours. After a reaction time of three hours at 1050° C. the melt was allowed to cool. The reaction product was dissolved in water and filtered. The residue consisted of $TiO_2$-needles with rutile structure.

What is claimed is:

1. A method for the production of fibrous refractory oxide whiskers of polyvalent elements selected from the group consisting of titanium, aluminum, silicon, tin, zirconium, antimony, iron or mixture thereof which comprises contacting one or more compounds of said elements with a molten bath of at least one salt of a sulfur-containing oxyacid, selected from the group consisting of bisulfates, sulfates and polysulfates for a time sufficient to convert said polyvalent metal to an oxide whisker thereof at 600 to 1200° C., and separating off the whiskers formed in the melt by such contact.

2. A method as claimed in claim 1 wherein said whiskers are titanium dioxide.

3. A method as in claim 1 wherein said molten bath additionally contains at least one metal halide.

4. A method as in claim 3 wherein the metal halide is selected from the group consisting of lithium chloride, sodium chloride, potassium chloride, magnesium chloride, and mixtures thereof.

5. A method as in claim 1 wherein the reaction is carried out at temperatures of between 750 and 950° C.

6. A method as in claim 1 wherein the salt of an oxyacid is selected from the group consisting of sulfates, hydrogen sulfates, polysulfates, thiosulfates and mixtures thereof.

7. A method as in claim 1 wherein alkaline earth metal sulfates or alkali metal sulfates or mixtures thereof comprise the molten bath.

8. A method as in claim 1 wherein a mixture of magnesium sulfate and sodium sulfate comprise the molten bath.

9. A method as in claim 3 wherein at least one of the sulfates selected from the group consisting of $Li_2SO_4$, $Na_2SO_4$, $K_2SO_4$, $CuSO_4$, $MgSO_4$, $ZnSO_4$, $CdSO_4$, $MnSO_4$, $NiSO_4$ and mixtures thereof is used as the oxyacid salt component of the molten bath and wherein at least one of the chlorides selected from the group consisting of LiCl, NaCl, KCl, $MgCl_2$, $CaCl_2$ and mixtures thereof is used as the metal halide component.

10. A method as in claim 2 wherein a titanium tetrahalide is used as the titanium reactant.

11. A method as in claim 2 wherein titanium tetrachloride is used as the titanium reactant.

12. A method as claimed in claim 3, wherein said salt is a sulfate and said halide is a chloride which is present in a proportion of 65 to 90 weight percent based on the weight of said sulfate and wherein the reaction time is at least 1 hour.

References Cited

UNITED STATES PATENTS

| 2,980,510 | 4/1961 | Berry | 23—202 |
| 3,241,928 | 3/1966 | Pease | 23—305 |
| 3,030,183 | 4/1962 | Berry | 23—202 |
| 3,338,677 | 8/1967 | Berry | 23—202 |
| 3,331,660 | 7/1967 | Berry | 23—51 |

EDWARD STERN, Primary Examiner

U.S. Cl. X.R.

423—659, 625, 617, 633, 335